Jan. 9, 1968 W. L. MORSE 3,362,099
DIRECTIONAL SINKER
Filed March 1, 1965 2 Sheets-Sheet 1

INVENTOR.
WILLIAM L. MORSE
BY Roy Mattern Jr.
ATTORNEY

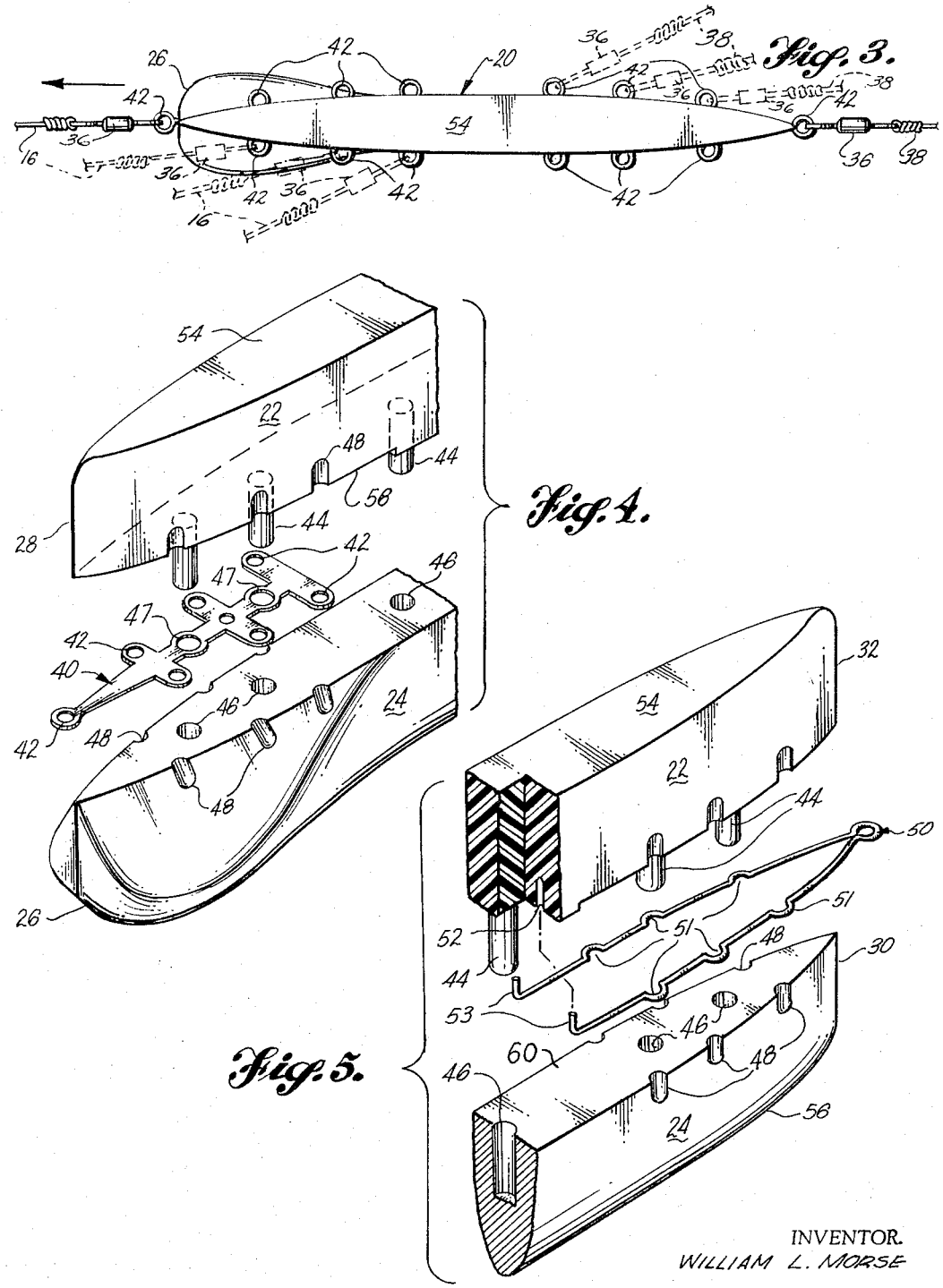

United States Patent Office 3,362,099
Patented Jan. 9, 1968

3,362,099
DIRECTIONAL SINKER
William L. Morse, Rte. 1, Box 121,
Issaquah, Wash. 98027
Filed Mar. 1, 1965, Ser. No. 436,163
3 Claims. (Cl. 43—43.13)

This invention relates to a sinker used in fishing when there is relative motion between the fishing boat and the water or between a stream or surf fisherman and water flowing by him. More particularly, the invention relates to a directional sinker which can be pre-adjusted selectively to move out away from the boat or fisherman and seek a certain depth.

The purpose of the invention is to provide a fishing sinker which is capable of acting as an "underwater pilot" for steering a bait or lure to a pre-designated area behind a fishing boat or in a flow of water such as in a stream or ocean tide and surf. Or stated in another way, the purpose of the invention is to provide a directional sinker which can be pre-adjusted by a fisherman to seek and then to maintain one of several relative positions, locations, or directions, with respect to a controlling starting position of the line to which the directional sinker is attached, such as the top ferrule of a fishing pole. The use of such adjustable directional sinker thereby substantially increases the spread or scan of the available fishing area and volume which formerly both were limited to the one direction the line took after it left the controlling starting position such as the rod and ferrule.

In attaining this purpose many objectives have been obtained: the sinker seeks this relative directional heading and stays on this heading until reeled in and adjusted; the adjustments are easily made and there can be a complete changeover in direction from right to left; these adjustments go hand in hand with changing the respective operational depths; the directional sinker will not spin nor roll over; and, when used on other lines following a boat, there will be no tangling of lines resulting from regular trolling maneuvers.

This so-called "educated" sinker or "underwater pilot" when adjusted by a fisherman on a boat moves out into the water that is not disturbed by the passage and noise of the boat. Moreover when this fisherman is with a group of fishermen, they can all agree to adjust their directional, "educated" or "underwater pilot" sinkers so that their lines may be deployed beyond the otherwise confining separating distances determined by their former positioning of only the tips of their respective fishing rods. These adjustments made to the directional sinker require only a second or two. As shown in FIGURE 2, on the preferred embodiment, any one of seven possible angles may be selected in securing the directional sinker to the line, to thereby determine the deployment of respective sinkers and associated baits and/or lures behind a boat or in a stream. Yet at the instant a fish strikes, the pre-set angular heading adjustments, under the increased pull, automatically shift back to the straightway heading, thus eliminating any possibility of the directional sinker being responsible for "steering" a hooked fish across another fishing line.

How such favorable operational results are obtained will be understood better as the following description is read and references are made to the drawings wherein:

FIGURE 3 is a top view of the directional sinker shown in FIGURE 2, with dotted lines indicating alternate places of line and leader attachment along a side of a directional sinker;

FIGURE 4 is a front half perspective composite view of spaced components of the directional sinker, showing: the heavier bottom section; the multiple eyelet line and leader anchoring plate which is ultimately held between the top and bottom sections; and the lighter top section; and FIGURE 5 is a rear half perspective composite view of spaced components of the directional sinker, showing: the heavier bottom section; a second embodiment of a line and leader anchoring means formed of strong wire bent to provide multiple partial eyelets, interconnected for quick position changes of swivel connected lines and leaders; and the lighter top section.

Before these directional sinkers were available when several fishermen were enjoying their sport while crowded aboard one boat, they made only an initial election as to their location about the rear of the boat 10. Thereafter, each man 12 directed his pole 14 to place his line 16, hopefully, in waters not being fished by someone else who was aboard the boat 10. Those persons who have gone fishing under these prior conditions and those commercial fishermen who had trolled with outrigger poles, knew that more control was needed in directing the line 16, leaders 38, and lures or bait.

Figure 1:
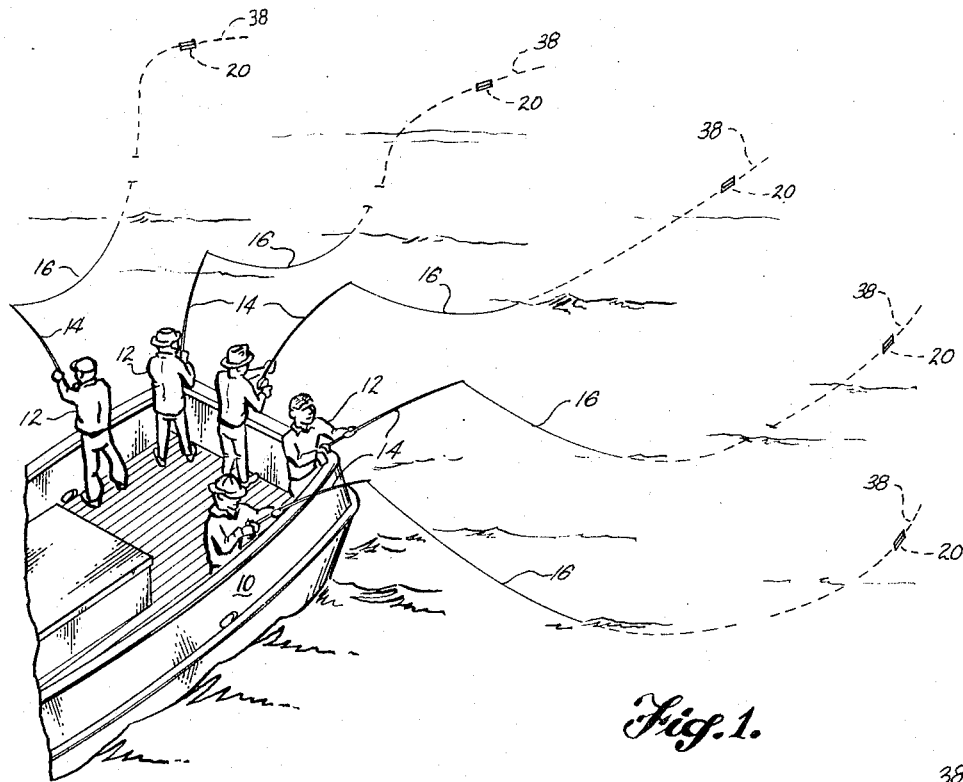
FIGURE 1 illustrates men fishing at the rear of a vessel which is underway, the men using poles, lines and the directional sinkers which are preadjusted to keep the lines, leaders and lures (not shown) apart from one another to avoid tangling.
Figure 2:
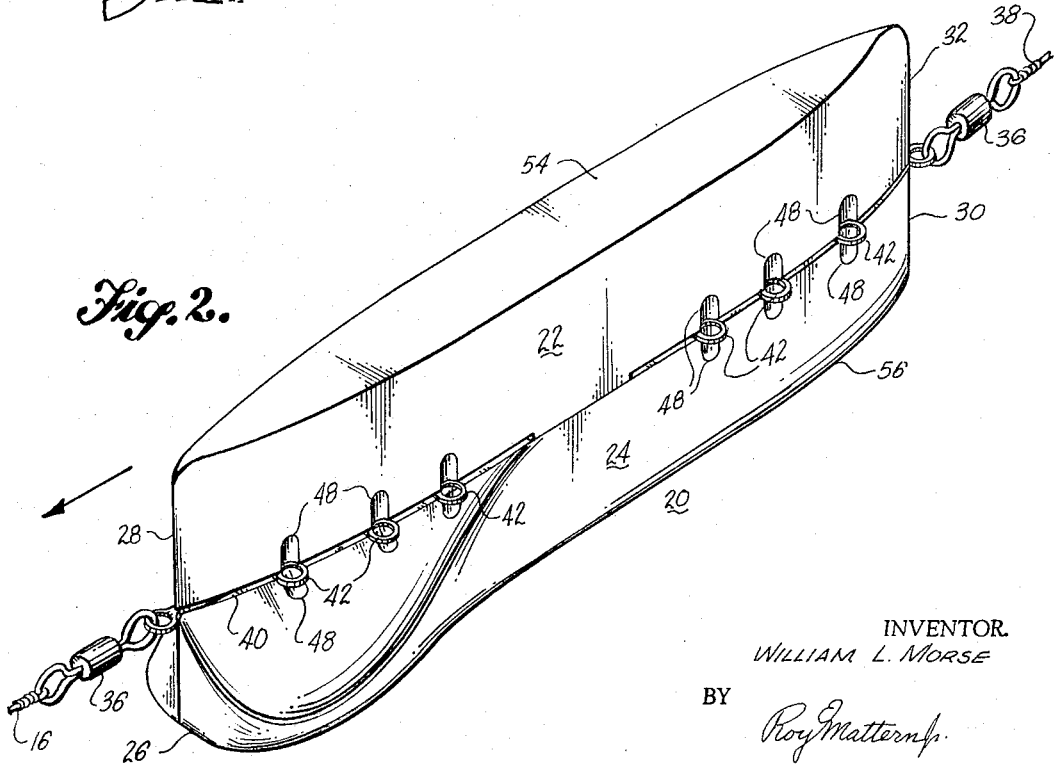
FIGURE 2 is an enlarged perspective view of a directional sinker having both a line and leader attached so the sinker will follow directly behind the boat or vessel.

The directional sinker illustrated throughout these figures completely furnishes this long awaited important element of control. It is now possible for fisherman before commencing to fish to agree with another fisherman to select a "heading" for his "directional sinker" which will direct his line, directional sinker and lure into waters not being fished by others on the same boat. The crew of a troller utilize this selective heading capability of the directional sinker to acquire the same non-interference deployment of respective lines, directional sinkers and lures or bait. So well does this directional sinker 20 accomplish this objective, as illustrated in FIGURE 1, by steering the widely separated courses for the bait and lures (not shown), that it has elatedly been called the first educated sinker.

To simultaneously perform its two functions of establishing a trolling depth and maintaining a course heading relative to the boat, the directional sinker 20 has a unique weight distribution and a well defined marine form for its rudder and sinker functions. For manufacturing advantages, the unique weight distribution requirement has been met by forming a top and bottom section. The bottom section 24 is cast of heavier material, such as metal, and the controlling stable center of mass is located forward forming a bulbous bow of excellent water flow characteristics. Except for this bulbous bow 26, the remainder of the heavier bottom section 24 is narrow in width in comparison to its depth and terminates in a tapered end 30. The top section 22 is made of lighter material, such as plastic, and it is also narrow in width in comparison to its depth. Its rear tapered end 32 matches the tapered end 30 of the bottom section 24. Its forward end has a taper 28 matching these rear tapers. The bulbous bow 26 therefore is reduced to match this forward tapered end 28.

To aid in the accurate alignment and assembly of these sinker and/or rudder forming body sections 24 and 22, during their manufacture, shear sustaining alignment pins 44 are formed on the bottom mating surface 58 of the top light section 22, of an oversize dimension for their press fit into receiving holes 46 along the top 60 of bottom section 24. Before this assembly is undertaken, however, a selection is made between line and leader attachment or anchoring means. The commercial fisherman, wanting a long lasting rugged sinker which he seldom will retrieve and reset during a cruise, may select an anchoring plate 40 having complete eyelets 42 to receive swivels 36 and having pin encompassing eyelets 47 to maintain its position between the assembled sections 22, 24. The sport fisherman, on the other hand, may wish to retrieve and reset the swivel attachment positions of his line and leaders quickly into the various alternate positions along each side, as indicated in FIGURE 3, to change the directional heading his sinker will assume while seeking also a new depth. Therefore, he will select the formed wire 50 as his attachment means, having partial eyelets 51 which combine with the accommodating swivel recesses 48, in both sections, to position the swivels, until they are intentionally moved to another partial eyelet, without any detachment being necessary. Positioning of form wire 51 occurs, as its turned up ends 53 are inserted into receiving holes 52 located in the bottom 58 of the top section 22.

Generally, the selection of anchoring means will be made only at the time of purchase, because cements may be relied upon also to keep the top and bottom sections connected together. Once assembled, these thin sections present a rudder form that is very effective.

To increase the effectiveness of the rudder form to seek a new directional heading and a new fishing depth, the line and leader attachment places are altered, as indicated in FIGURE 3. At all times, however, the line 16 and leader 38 must be in alignment as they approach and depart from the directional sinker 20. If the line 16 is attached through its swivel to the second eyelet on the left side, then the leader through its swivel must be attached to the second eyelet on the right side, counting of course from the opposite ends of the directional sinker 20. As the swivels are attached nearer the center of the sinker 20, the angularity increases between the overall direction of the fishing line 16 and the directional sinker 20. Therefore the rudder action of the directional sinker becomes more effective and the line 16 is carried farther away from the wake of the boat or a shoreline as the line directional sinker, and lure or bait move to the new designated spot in the waters.

To further assist in this directional and depth control, the top 54 of the top section 22 is formed flat in a plane paralleling the mating surfaces 58 and 60 to also serve as a directional surface as the directional sinker tilts when it is directed to a new course heading farther away from a boat or the shore of a stream. To improve the directional characteristics of the heavier portions, the bottom surface 56 aft of the bulbous bow 26 is made thinner and rounded off, as indicated in FIGURE 5.

As constructed and formed, as described, and attached between a leader and a line, this directional sinker truly adds enjoyment and success to the sport and business of fishing. Tangled lines now only result, when the hooked fish in trying to escape, may cross over lines and when this occurs, the possible resulting entanglement is a willing cost to be paid for the catch.

I claim:

1. A directional sinker adapted for selective placement on a fishing line to guide bait and lures to a relative angular position and depth position with respect to a place of control over the positioning of the fishing line such as on board a boat and alongside a stream, comprising:
   (a) a two-piece body, having an upper portion with top and bottom parallel flat surfaces and having its upstanding side surfaces extending between these parallel flat surfaces commencing in a tapered bow, continuing in a uniform central portion and terminating in a tapered stern, and having a lower portion with top and bottom parallel flat surfaces, parallel to those flat surfaces on the upper portion, the top parallel surface matching the bottom parallel surface of the upper body portion and having its upstanding side surfaces commencing in a bulbous bow, continuing in a uniform central portion matching the above central portion and terminating in a tapered stern which matches the tapered stern of the upper body portion, the lower portion being made heavier in overall weight to remain below the upper portion during use;
   (b) means on the respective body portions used to secure them together; and
   (c) attachment means for a fish line and a leader located between the assembled two-piece body at the matching flat surfaces of the top and bottom body portions and having portions extending outwardly beyond the said upstanding side surfaces of the body portions so that the directional sinker may be selectively adjusted with its longitudinal axis either in alignment with a tensioned fish line and leader or at selected angles with respect to the direction determined by a tensioned fish line and leader whereby upon such angular adjustments the drectional sinker maintains an angle of attack with respect to its actual direction of travel so that the directional sinker will steer itself to a pre-determined relative fishing position.

2. A directional sinker as claimed in claim 1, wherein the said line and leader attachment means is a flat plate and the said extending portions are eyelets.

3. A directional sinker as claimed in claim 1, wherein the said line and leader attachment means is a formed wire and the said extending portions are partial eyelets formed integrally with the wire.

References Cited

UNITED STATES PATENTS

| 810,017 | 1/1906 | Ackerman | 43—42.09 |
| 2,184,031 | 12/1939 | Wyatt | 43—42.39 |
| 2,397,030 | 3/1946 | Mercier | 43—43.1 X |
| 2,983,065 | 5/1961 | Ferguson et al. | 43—42.09 |
| 2,726,475 | 12/1955 | Wiselka | 43—43.13 |
| 2,924,907 | 2/1960 | Hamilton | 43—43.13 |
| 3,032,912 | 5/1962 | Bengtsson | 43—43.13 |

FOREIGN PATENTS

| 1,010,313 | 6/1957 | Germany. |
| 130,245 | 7/1919 | Great Britain. |

SAMUEL KOREN, *Primary Examiner.*

D. J. LEACH, *Assistant Examiner.*